United States Patent [19]
Ho

[11] Patent Number: 6,108,135
[45] Date of Patent: Aug. 22, 2000

[54] PLANAR PROXIMITY LENS ELEMENT AND DISK DRIVE USING SAME

[75] Inventor: Easen Ho, San Jose, Calif.

[73] Assignee: Digital Papyrus Corporation, Sunnyvale, Calif.

[21] Appl. No.: 09/098,048

[22] Filed: Jun. 16, 1998

Related U.S. Application Data

[60] Provisional application No. 60/049,503, Jun. 16, 1997.

[51] Int. Cl.[7] .................. G02B 3/00; G02B 7/02; G11B 7/00
[52] U.S. Cl. ............ 359/654; 359/742; 359/819; 369/44.14
[58] Field of Search ................ 359/819, 742, 359/654; 369/44.14

[56] References Cited

U.S. PATENT DOCUMENTS

| | | | |
|---|---|---|---|
| 3,626,194 | 12/1971 | Hirano et al. | 359/654 |
| 4,458,980 | 7/1984 | Ohki et al. | 369/44.14 |
| 4,638,471 | 1/1987 | Van Rosmalen | 369/44.14 |
| 5,125,750 | 6/1992 | Corle et al. | 359/819 |
| 5,140,572 | 8/1992 | Kibune et al. | 369/44.14 |
| 5,144,603 | 9/1992 | Mozume et al. | 369/44.14 |
| 5,481,386 | 1/1996 | Shimano et al. | 369/44.14 |
| 5,497,359 | 3/1996 | Mamin et al. | 369/44.15 |
| 5,515,353 | 5/1996 | Miyazaki et al. | 369/44.14 |
| 5,515,354 | 5/1996 | Miyake et al. | 369/44.14 |
| 5,608,695 | 3/1997 | Yamazaki | 369/44.14 |
| 5,666,197 | 9/1997 | Guerra | 356/359 |
| 5,721,629 | 2/1998 | Lee | 369/44.14 |
| 5,729,393 | 3/1998 | Lee et al. | 359/819 |
| 5,870,229 | 2/1999 | Tsuchida | 359/654 |

FOREIGN PATENT DOCUMENTS

| | | |
|---|---|---|
| 0 731 457 A2 | 9/1996 | European Pat. Off. . |
| 9 814 468 A1 | 12/1997 | European Pat. Off. . |
| 44 04 635 A1 | 8/1994 | Germany . |
| 6-076400 | 3/1994 | Japan . |
| WO96/27880 | 9/1996 | WIPO . |

Primary Examiner—Georgia Epps
Assistant Examiner—Evelyn A. Lester
Attorney, Agent, or Firm—Wolf, Greenfield & Sacks, P.C.

[57] ABSTRACT

A planar solid immersion lens has flat surfaces on both the top and bottom. The planar structure is made to function as a solid immersion lens by including compensation for the refraction of light rays entering the top surface of the solid immersion lens other than normal to the top surface. Compensation can be provided by using a radial graded index lens material or by including on the top surface a surface relief diffraction grating. The planar solid immersion lens can be included in a slider or flying head used in an optical disk drive data recording system.

22 Claims, 4 Drawing Sheets

PLANAR PROXIMITY LENS ELEMENT AND DISK DRIVE USING SAME

This application claim benefit to U.S. provisional Ser. No. 60/049,503 Jun. 16, 1997.

BACKGROUND

1. Field of the Invention

The present invention relates generally to optical systems for use with visible and near-visible wavelengths of light. More particularly, the present invention relates to such optical systems, used in optical data storage devices.

2. Related Art

Optical systems use a variety of lenses and other elements to manipulate light. The basic element used to focus a light beam in a simple optical system is referred to hereinafter as an objective lens. A simple optical system is illustrated in FIG. 1, in which a light beam 101 passes through a first medium 103, typically air, through a first interface 105 into a second medium 107 of which the objective lens 108 is formed, and then through a second interface 109 back into the first medium 103. The objective lens 108 focuses, or causes to converge, rays of light 111, 113 comprising the light beam 101, so that they form a small spot 115 at a target 117.

The simple optical system of FIG. 1 has an apparent resolving power which depends upon the effective numerical aperture achieved by the system design. Numerical aperture (NA) is a parameter known to those skilled in this art and readily calculated based upon the wavelength of the light involved, the indices of refraction (n) of the first and second media, and other readily measured physical characteristics of the system.

Immersion lenses of various types are well-known in the field of optical microscopy to improve the apparent resolving power of optical microscopes. Common immersion lenses used in optical microscopy include oil immersion lenses and solid immersion lenses (FIG. 2, 201), both of which are located between the objective lens and the target, thereby increasing the numerical aperture of the system. Achievable numerical aperture figures include NA>1. Immersion lenses, including solid immersion lenses achieve the high NA figures by conducting light to the target through a medium having a high index of refraction which is either in contact with or evanescent wave coupled to the target. Evanescent wave coupling occurs when the wavefront of a light beam extends a microscopic distance past an interface surface before being internally reflected at the interface surface. Such a wave can couple into adjacent materials, such as the target.

The use of solid immersion lenses has been extended to the field of optical data recording, for example as disclosed by Corle et al. in U.S. Pat. No. 5,125,750, incorporated herein by reference in its entirety. The system disclosed by Corle et al. includes a SIL having a flat lower surface adjacent the target and a hemispherical upper surface facing an objective lens. A laser light beam is shone through the objective lens and the SIL onto the target. Corle et al. teach that the hemispherical shape of the top surface of the SIL ensures that light rays comprising the light beam which has been focused by the objective lens enter the SIL normal to the hemispherical top surface of the SIL, while the flat shape of the lower surface ensures that the SIL can be located at a uniform distance from the target, i.e., a data recording medium. Corle et al. teach that use of their system reduces the spot size of the light focussed on the target by a factor $1/n$, where n is the index of refraction of the SIL material.

The use of SILs in optical data recording has been advanced beyond the teachings of Corle et al. noted above, for example by Mamin et al., as disclosed in U.S. Pat. No. 5,497,359, incorporated herein by reference in its entirety. Mamin et al. teach that the hemispherical SIL of Corle et al. can be improved upon by increasing the thickness thereof at the center beyond the thickness a hemispherical shape would have. Marnin et al. reduce the spot size of the light focussed on the target by a factor $1/n^2$, where n is again the index of refraction of the SIL material.

The use in an optical disk flying head of a SIL with a hemispherical top and a curved bottom surface is disclosed by Berg et al. in U.S. Pat. No. 5,729,393, incorporated herein by reference in its entirety. The lower surface of the SIL disclosed in Berg et al. has a curve which stabilizes the flight and performance of the device in a flying optical disk drive head. The radius of curvature used is not more than about 10 meters.

SILs as known in the art present certain problems, which make their use difficult and expensive in practical optical disk drive storage systems. In combination with a flat bottom surface, the hemispherical shape or other bulging shape is difficult to construct, difficult to align with other components of an optical system and imposes spacing and tooling constraints on the optical system design.

SUMMARY OF THE INVENTION

According to one aspect of the invention, a proximity lens element (PLE) has two surfaces through which an incident light beam passes, and the PLE is substantially flat on both surfaces thereof.

According to another aspect of the invention, there is provided a method of modifying a light beam having an axis and comprising a plurality of light rays directed substantially parallel to the light beam axis. The method comprises steps of: receiving the light beam from a first medium into a second medium at a substantially flat interface therebetween; modifying by different amounts, directions through the second medium traversed by different light rays of the light beam; and receiving the modified light beam from the second medium into a target medium through a substantially flat surface of the second medium.

Finally, according to yet another aspect of the invention, an optical disk drive includes a PLE having two surfaces through which an incident light beam passes and which is substantially flat on both surfaces thereof.

BRIEF DESCRIPTION OF THE DRAWING

In the accompanying drawing, in which like reference designations indicate like elements.

DETAILED DESCRIPTION

Construction and use of a number of embodiments of the invention is now described in greater detail with reference to the accompanying drawing.

Figure 3:
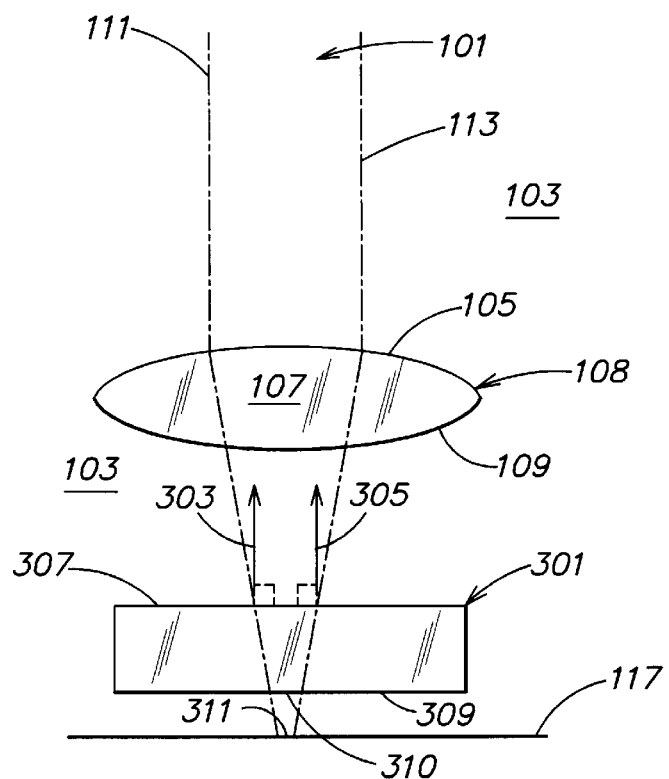
FIG. 3 is a schematic view of an optical system augmented with a planar PLE.

Briefly described, as shown in FIG. 3, one embodiment of the present invention is a lens element 301 having two surfaces 307, 309 through which an incident light beam 101 passes and which is substantially flat on surface 307 and wherein surface 309 behaves as though optically flat in the exit aperture region 310, where the light beam evanescently radiates or otherwise exits the lens element 301, referred to hereinafter as a "planar proximity lens element" or "planar PLE." In this description, a proximity lens shall be an optical element which is located close to or within evanescent wave coupling distance of a target and which may have an optical power ranging from no focussing power to all the focussing power required to focus a beam of light, however incident, to a point. When a PLE has no focussing power beyond that required to allow a properly focussed beam to pass through the PLE as if the top surface 307 does not exist, and is evanescently coupled to the target, then it is operating similarly to a conventional solid immersion lens. Several variations of this embodiment are also described.

The term "planar PLE" is also used herein to encompass a PLE, described below, in which a top surface 307, i.e. that surface usually facing an objective lens 108 or light source (not shown), is substantially flat, but a bottom surface 309, i.e. that surface usually facing a target 117 such as a recording medium, may be curved or have functional shapes. In such a device, it should be noted that the bottom surface 309 still behaves optically flat in the exit region 310, which may be a region 1 micron in diameter.

As used herein, a "substantially flat" surface is one which is macroscopically flat, as opposed to a hemispherical or parabolic surface. A substantially flat surface may contain microscopic features including, for example, diffraction gratings, surface relief patterns or other curvatures, provided the mean change in height from an absolute mechanical flat having negligible height variation as measured using an optical interferometer is on the order of the wavelength of the light at which the device is intended to operate. Note that a bottom surface 309 that is substantially flat and whose curvature, if any, also complies with this definition will behave optically flat in the exit region 310.

Another embodiment of the invention incorporates a planar PLE in an optical disk drive having a flying optical head.

Reference is made in this description to light rays normal to a surface. In a classical view of optics, a beam of light can be separated into rays whose direction is defined by the direction of wavefront propagation at a location in the beam. Although common usage sometimes refers to a beam normal to a lens surface as one parallel to the optical axis of the lens, this description refers to individual ray directions, except in the case of evanescent waves, where this does not apply. Thus a ray normal to a surface of an element is not necessarily parallel to the optical axis of the element.

A simple glass or polycarbonate optical flat is not usable as a SIL or PLE 301. Because it is flat on both top and bottom surfaces, it causes undesirable refraction of individual incident rays, by varying amounts, at the top surface thereof, when light rays reaching the top surface from the objective lens do not arrive normal to the top surface, where "normal" means making an angle of 90°.

Figure 1:
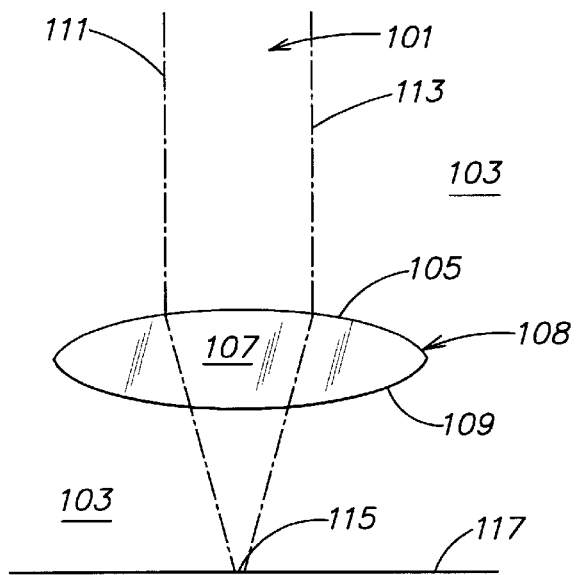
FIG. 1 is a schematic view of a conventional simple optical system.
Figure 2:
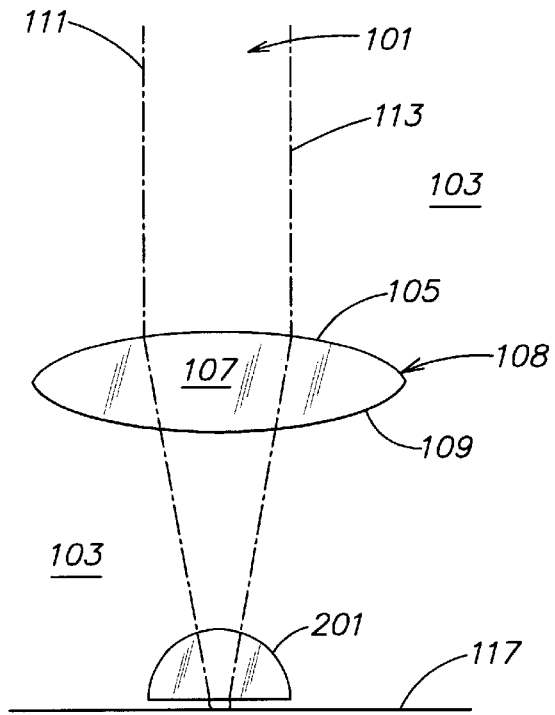
FIG. 2 is a schematic view of a conventional simple optical system augmented with a SIL.

In order to use an optical element having a flat top surface 307 and a flat bottom surface 309 as a planar PLE 301, light rays 111, 113 which do not arrive normal 303, 305 to the top surface 307 need to be compensated so they focus at the desired focal point 311. The compensation should bend the light rays 111, 113 so that they reach the lower surface 309 of the planar PLE 301 at approximately the same angle as though they had passed through a hemispherical SIL (FIG. 2, 201, for example), instead.

Figure 4:
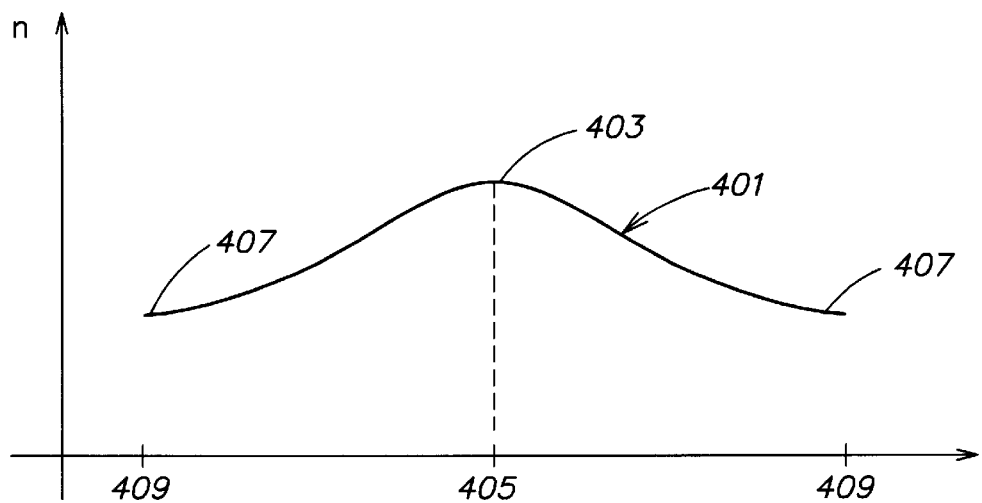
FIG. 4 is a graph of index of refraction in a GRIN compensated planar PLE.

A glass or plastic, such as a polycarbonate, Graded Index (GRIN) optical component can compensate the light rays as described above. Reference is now made to FIG. 4. The focusing effect is achieved as rays of light are continuously refracted along a continuously varying index of refraction 401, referred to as an index gradient, built into the substrate. Producing a glass or polycarbonate optical component with an index gradient by spatially varying the material composition or impurity levels within the body of the optical component is well known. Because the focusing effect can be achieved by the index gradient and not by a physical curvature, the top surface, i.e., the surface facing the objective lens or light source, can be made flat. A ray entering an optically denser medium, i.e., a medium having a higher index of refraction, through an interface surface at an oblique angle of incidence with the interface surface will tend to be refracted, i.e., bent, to a path closer to surface normal. The built in index gradient of a GRIN compensated planar PLE is selected to substantially offset the effect of refraction at the interface surface.

Various profiles of the index gradient can be used, depending on the nature of the incident light and other requirements. Such index profiles can either be radial gradients, where the index is made to vary perpendicular to the optical axis, or axial gradients, where the index is varied along the optical axis. One example radial profile for the index of refraction of a GRIN compensated planar PLE is shown in FIG. 4. The index of refraction 401 peaks 403 substantially at the optical axis 405 of the PLE and falls off to lower values 407 at the periphery 409 of the PLE. Profiles which are commercially available in GRIN materials include spherical and parabolic profiles, i.e., profiles which vary as a function of r, where r represents distance from the optical axis 405. For PLEs employing GRIN, that function similarly to conventional hemispherical top, flat bottom SIL elements, and where the incident beam is already properly converging, for example, having a spherical wavefront, then the desired index profile can be that of a radial GRIN with a spherical index profile having the maximum index substantially at the optical axis. Axial GRIN can also be designed for the pre-converged case, to focus all light to a single point because non-normal rays will experience different amounts of local refraction as a function of angle of incidence. For applications where the light rays are collimated, i.e., where all rays appear to be parallel to the optical axis, then only a properly designed radial GRIN with a large index gradient can focus all rays to a single point.

Figure 5:
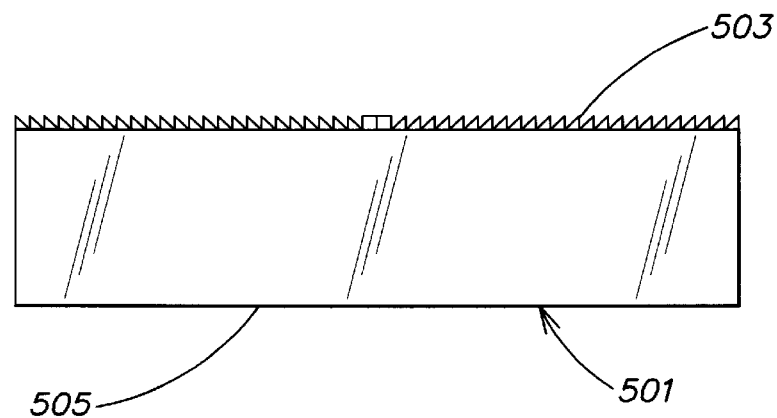
FIG. 5 is a side elevation view of a diffraction compensated planar PLE.

As shown in FIG. 5, an alternative compensation structure useable in a planar PLE 501 according to the invention makes use of diffractive optical elements 503 that can be easily fabricated using known planar processes onto a glass or polycarbonate slab 505. For example, Fresnel zone plates, frequently used in optical projection systems as well as micro-lenses, can be used to provide the focusing correction. Ordinarily, parabolic or spherical phase front curvatures are the corrections introduced. However, if other corrections are desired, for example, wavefront aberration correction, holographic diffraction patterns or complex diffraction gratings can be used. Parallel to the above discussion on GRIN PLEs, at least one design of diffractive PLE will function as a conventional hemispherical top, flat bottom SIL does, if the diffractive profiles provide just enough modification of the individual incident rays so that each ray will pass through the top surface of the diffractive PLE without changes to their direction of propagation, such as normally occurs at a planar interface. In this case, the function of the top surface of the diffractive PLE is essentially indistinguishable from a properly matched hemispherical refractive surface, except for possible diffractive losses and phase differences. In yet another implementation of the diffractive PLE where the incident light is collimated, the diffractive profile will not only have to provide the function of a refractive spherical surface, but also provide appropriate bending of each light ray to converge at a desired point.

Figure 6:
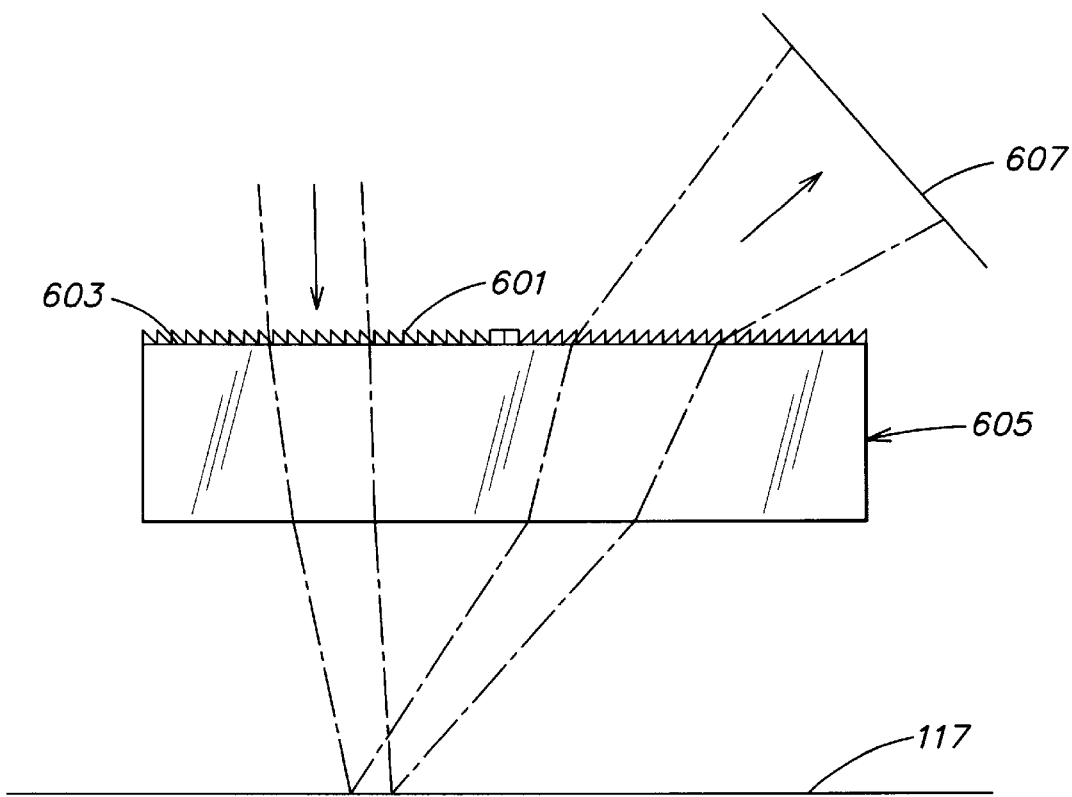
FIG. 6 is a schematic view of an optical system using a diffraction compensated planar PLE as a beam splitter.

A combination of GRIN and diffractive elements can give added freedom to optical designers to achieve specific goals. For example, the index gradient in a planar PLE using GRIN compensation can also provides focusing power, while a diffractive grating relief pattern fabricated on to the top side can further be used to correct spherical aberrations, etc. or vice versa. In another example, shown in FIG. 6, a diffraction grating can be incorporated into the diffractive relief pattern 601 on the top surface 603 which provides multiple diffraction spots. The hologram or diffraction grating can thus also redirect reflected light from the target 117, e.g., a data medium surface, to a detector 607. When the target 117 is a data recording medium, the detector 607 can be part of the read apparatus for detecting microscopic optical data marks and spaces on an information recording layer thereof.

In general, a PLE can be designed for a variety of purposes, depending on whether it is evanescently coupled to the target and on how much focussing power is built into it. The focussing power of the PLE can be varied so some or all of the focussing of an optical system is provided by the PLE. Thus, for example, the PLE can be used as a singlet in an optical system in which it provides focussing power and also evanescently couples the focussed beam into the target.

The lower side of the planar PLE is now described. It is well-known in the magnetic recording industry that providing the lower surface of the slider that faces the recording medium with a functional curvature is essential to reliable and stable flight of flying heads. In an optical disk drive system using a planar PLE to perform near field optical recording, the bottom surface of the PLE, i.e., the surface facing the data recording medium, is maintained at a specific distance from the data recording medium by the generation of an air bearing between the data recording medium, e.g., a rotating disk, and a slider body, or flying head, designed to support the PLE, the bottom surface of the PLE element will also require a functional curvature to ensure stable flight and to improve head disk interface reliability.

Some example of doublets using the planar PLE are now described.

In a doublet application of the planar PLE, the objective lens element provides most of the focusing power. This power can be provided by using an aspherical, refractive lens; a substantially flat diffractive element; a substantially flat radial GRIN element; or an element combining refractive, diffractive and GRIN technologies. The two substantially flat elements mentioned above can be flat on both sides. The planar PLE provides just enough focussing power using GRIN or diffraction compensation or a combination thereof to correct the deleterious effect of rays entering the planar PLE at a non-normal angle of incidence. Therefore, in a doublet system, NA of the planar PLE can be relatively low. Any of the objective lenses mentioned above can be combined with any planar PLE, including one using diffractive compensation, GRIN compensation or a combination of compensations.

Several variations of a planar PLE useable in doublet configurations are now discussed. The bottom surface of the various planar PLEs (i.e., the surface facing the target, e.g., a recording medium), can either be optically flat or may be curved to allow for best flying head performance and reliability. Since the amount of correction can be made to vary as a function of distance from the optical axis (see, e.g., FIG. 4), radial GRIN and diffractive patterns are particularly suited to the present invention. Either can compensate for a non-flat bottom surface, as well as a flat top surface. Some planar PLE designs using GRIN or diffractive pattern technologies to achieve the desired focussing include:

Planar PLE with diffraction grating. Here the diffraction grating surface relief pattern causes enough bending of a light ray to counter the bending of the light ray as it enters the top of the planar PLE. The diffraction grating surface relief pattern can be a multi-level phase grating, or a kinoform structure. Additional aberration correction functions can also be built into the diffraction grating surface relief structure.

Planar PLE with radial GRIN compensation. Here the radial change in the index of refraction, i.e., decreasing index from the optical axis of the lens to its outer periphery, provides enough power to bend the light back to a single focus, as if each ray had entered a hemispherical SIL normal to the top surface.

Planar PLE with axial GRIN compensation. Here the axial change in the index of refraction combined with the non-uniform incidence of impinging light rays, causes each light ray to experience different index profiles and provides enough power to bend the light back to a single focus, as if each ray had entered a hemispherical SIL normal to the top surface.

Some advantages of the invention are now briefly discussed.

Flat elements allow for easier handling by providing a datum surface for precise alignment. In an optical doublet having high NA, for example, the separation between the two lenses needs to be precisely controlled. Such a doublet may include a SIL and an objective lens. A SIL having a flat surface or microscopic relief pattern that can be precisely referenced to a flat surface facing the objective lens could greatly simplify assembly tooling design and facilitate the alignment process, particularly if the bottom surface of the first lens facing the SIL is also made flat.

Specific aberration correction can be built into either the GRIN profile or diffractive profile, for example to correct for spherical or astigmatic aberration. Also, in near-field optical data recording where evanescent coupling is used, or in high-NA optical systems where high angles of incidence are involved, inhomogeneous phase delays can be introduced inadvertently. An optimally designed optical system should control the relative phase of the rays that are converging at or beyond the bottom of the SIL in order to obtain the smallest spot size. GRIN or diffractive elements can be used to impart such an optimized phase profile, using design techniques familiar to the skilled artisan.

Figure 7:
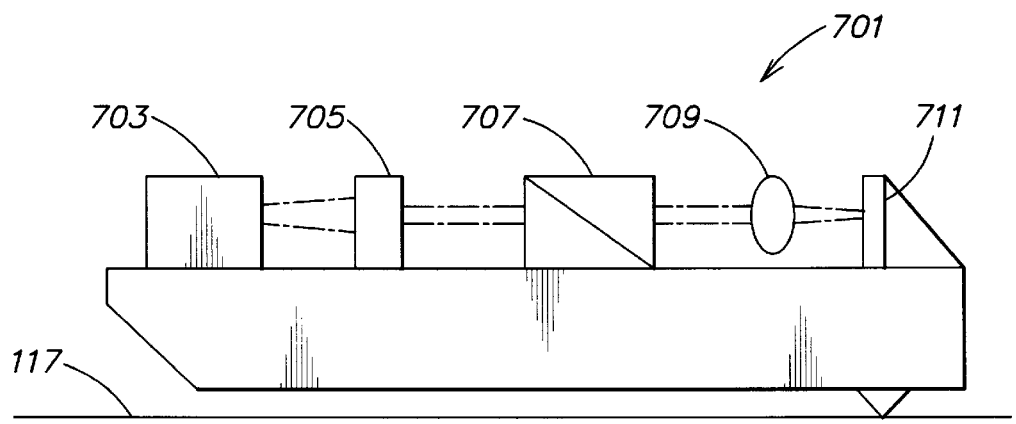
FIG. 7 is a schematic view of a planar PLE used in an optical data storage disk drive on a flying head.

Use of a planar SIL permits construction of a hybrid integrated slider optical head having several optical elements integrated or mounted onto a slider body used in an optical disk drive, as shown in FIG. 7. Such an integration presently requires a 90° bend in the optical path. Such a bend is achieved by either a waveguide, or a reflecting surface incorporating either a GRIN element or diffractive element. The slider 701 shown includes a laser light source 703, a collimator 705, a beam splitter and detector 707, an objective lens element 709 and a SIL built into a 90° prism. The use of the planar SIL permits construction of the optical system entirely on the slider 701.

Figure 8:
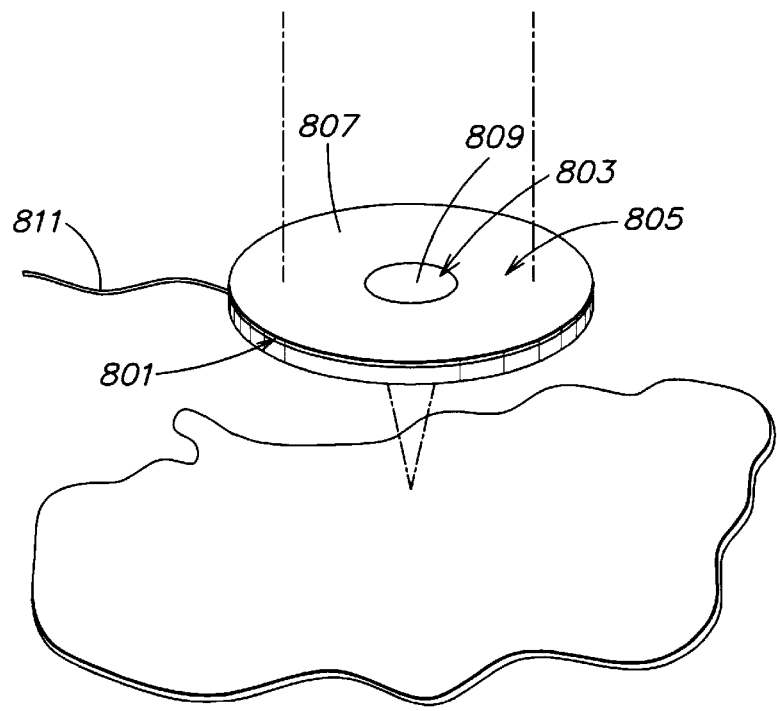
FIG. 8 is a schematic view of a planar PLE with spatial modulators disposed on a top surface thereof.

Flat elements leave more room for including additional functional elements, such as light shutters, mirrors and polarization elements between an objective lens element and the planar PLE. For example, a spatial light modulator 801 using micro-shutters made using LCD technology can be integrated onto one or more of the flat surfaces of a planar PLE, as shown in FIG. 8. A spatial light modulator 801 isolates one region 803 of the PLE from another 805 and thus ensures that no cross-talk occurs between the two regions 803, 805 during operation. The outer zone 805 focusses light to one focal point while the inner zone 803 focusses light to a second focal point. The outer shutter 807 and the inner shutter 809 can be made to open at different times, responsive to a control signal carried on one or more signal wires 811, so that cross-talk is prevented, even though light beams intended for the two different focal points may overlap.

The invention has now been described in connection with a number of specific embodiments thereof. Numerous extensions and modifications to those embodiments, also contemplated as within the scope of the invention, will now be obvious to those skilled in this art. The scope of the invention should not be considered to be limited by the foregoing, but rather is defined by the following claims and equivalents thereto, when properly construed.

What is claimed is:

1. In a flying air bearing slider, a proximity lens element (PLE) having two surfaces through which an incident light beam passes and which is substantially flat on one surface thereof and which has a second surface which contains an exit region for the light beam which is optically flat, a diffractive relief pattern defined on one of the two surfaces thereof which provides refraction compensation for refraction of light rays entering one of the two surfaces of the PLE at other than a normal angle to the surface.

2. The PLE of claim 1 wherein the second surface has a radius of curvature not less than about 10 meters.

3. The PLE of claim 1, in which the light beam travels substantially along an optical axis of the PLE, the PLE comprising: graded index (GRIN) material having a lower refractive index near an edge of the SIL element than near the optical axis thereof.

4. The PLE of claim 3, wherein the index of refraction is graded to produce a spherical wavefront distribution.

5. The PLE of claim 1, further comprising:
   a light modulator disposed on one of the two surfaces thereof, which selectively admits light responsive to a control signal applied thereto.

6. The PLE of claim 1, in combination with a second lens element, the second lens element comprising:
   a lens body defining at least one flat surface aligned in parallel with one of the flat surfaces of the PLE.

7. The PLE of claim 1, wherein the incident light beam is preconverged to focus at a point at or just beyond the exit region, the PLE including compensation causing the incident light beam to pass through the PLE to the exit region as though through a hemispherical solid immersion lens.

8. A method of modifying a light beam having an axis and comprising a plurality of light rays directed substantially parallel to the light beam axis which is directed through optical elements carried by a flying air bearing slider, the method comprising steps of:
   receiving the light beam from a first medium into a second medium carried by the air bearing slider at a substantially flat interface therebetween;
   modifying by different amounts, directions through the second medium traversed by different light rays of the light beam;
   receiving the modified light beam from the second medium into a target medium through a substantially flat surface of the second medium; and
   passing the light beam through a diffraction grating at one of the flat surfaces of the second medium.

9. The method of claim 8, wherein the step of modifying further comprises:
   continuously varying an amount of modification as a function of distance from the light beam axis.

10. The method of claim 9, wherein the step of continuously varying uses a function of distance which produces a spherical wavefront modification.

11. The method of claim 9, wherein the step of continuously varying is performed at the interface at which the light beam is received.

12. The method of claim 9, wherein the step of continuously varying is performed within the second medium.

13. The method of claims 9, wherein the step of continuously varying further comprises:
   converging a first group of light rays at a first focus; and
   converging a second group of light rays at a second focus.

14. The method of claim 13, further comprising:
   alternately restricting operation of the method to one of the first group and the second group at different times.

15. An optical disk drive including a flying air bearing slider carrying a proximity lens element (PLE) having two surfaces through which an incident light beam passes and which is substantially flat on one surface thereof and which has a second surface with an optically flat exit region for the light beam, a diffractive relief pattern defined on one of the two surfaces thereof which provides refraction compensation for refraction of light rays entering one of the two surfaces of the PLE at other than a normal angle to the surface.

16. The optical disk drive of claim 15, wherein the second surface of the PLE has a radius of curvature not less than about 10 meters.

17. The optical disk drive of claim 15, in which the light beam travels substantially along an optical axis of the PLE, the PLE comprising:
   graded index (GRIN) material having a lower refractive index near an edge of the PLE than near the optical axis thereof.

18. The optical disk drive of claim 17, wherein the index of refraction is graded to produce a spherical wavefront distribution.

19. The optical disk drive of claim 15, the PLE further comprising:
   a light modulator disposed on one of the two surfaces thereof, which selectively admits light responsive to a control signal applied thereto.

20. The optical disk drive of claim 15, further comprising a second lens element, the second lens element comprising:
   a lens body defining at least one flat surface aligned in parallel with one of the flat surfaces of the PLE.

21. A proximity lens element (PLE) having two surfaces through which an incident light beam passes and which is substantially flat on one surface thereof and which has a second surface which contains an exit region for the light beam which is optically flat, further comprising:

a light modulator disposed on the surface thereof, which selectively admits light responsive to a control signal applied thereto.

22. An optical disk drive including a proximity lens element (PLE) having two surfaces through which an incident light beam passes and which is substantially flat on one surface thereof and which has a second surface with an optically flat exit region for the light beam, the PLE further comprising:

a light modulator disposed on the surface thereof, which selectively admits light responsive to a control signal applied thereto.

\* \* \* \* \*